United States Patent Office 2,755,641
Patented July 24, 1956

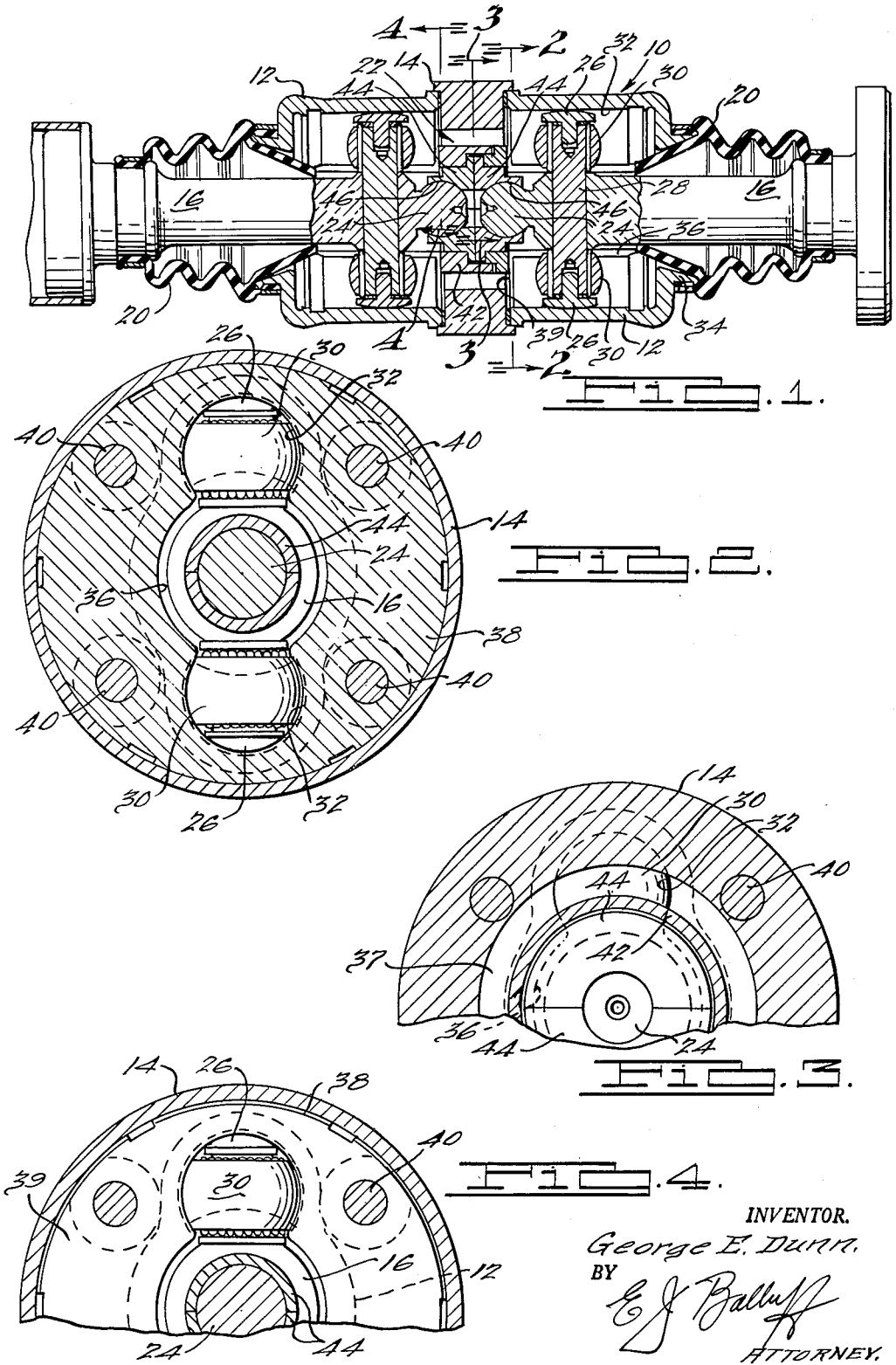

2,755,641

UNIVERSAL JOINT

George E. Dunn, Dearborn, Mich., assignor, by mesne assignments, to Chrysler Corporation, Detroit, Mich., a corporation of Delaware Application September 21, 1953, Serial No. 381,439

1 Claim. (Cl. 64—21)

This invention relates to constant velocity universal joints of the so-called doubletype.

In joints of this type, as illustrated for example in Wollner U. S. Patent No. 2,106,672, and Trbojevich U. S. Patent No. 2,087,364 and 2,186,846, a single ball and socket type of coupling usually is provided to interconnect the shafts, and the lubrication of this coupling presents a problem. This coupling in addition must accommodate the entire angular displacement between the shafts. Axially centering this coupling and the two joints with respect to their housing also presents a problem. In addition, the design of the housing or body for such joints and the sealing of the same with respect to the shafts present difficult problems.

My invention as illustrated in this application because of its novel design either entirely overcomes or substantially minimizes the seriousness of such problems. In accordance with my invention, the joint comprises essentially two conventional joint assemblies interconnected by means of a unique spacer and coupling arrangement, the whole arrangement being such as to eliminate or substantially reduce the problems heretofore encountered in joints of this type.

A principal object of the invention is to provide a new and improved constant velocity universal joint of the so-called double type in which most of the parts are standard parts used in conventional joint assemblies of the same basic design.

Other and further objects of the invention will be apparent from the following description and claim and may be understood by reference to the accompanying drawings, of which there is one sheet, which by way of illustration show a preferred embodiment of the invention and what I now consider to be the best mode in which I have contemplated applying the principles of my invention. Other embodiments of the invention may be used without departing from the scope of the present invention as set forth in the appended claim.

In the drawings:

Fig. 1 is a longitudinal sectional view of a joint embodying my invention;

Fig. 2 is an enlarged cross sectional view taken along the line 2—2 of Fig. 1;

Fig. 3 is an enlarged fragmentary sectional view taken along the line 3—3 of Fig. 1; and Fig. 4 is an enlarged fragmentary sectional view taken along the line 4—4 of Fig. 1.

As illustrated in the drawings, a universal joint embodying my invention comprises a housing indicated generally at 10 which comprises a pair of hollow bodies 12 disposed in line, a spacer 14 seated on and secured to said bodies, a shaft 16 projecting into each body 12, sealing means 20 between each of the bodies 12 and the shafts 16 forming a flexible seal therebetween, each of the shafts 16 being provided within its respective body with means for centering the shaft therein and for transmitting torque between the shaft and the body in all relative working positions thereof, and a coupling indicated generally at 22 which interconnects the shafts 16 and which has a divider associated therewith so as to split the angularity between the two shafts 16. Each of the bodies 12 and the shaft and the centering and torque transmitting means associated therewith essentially comprise a sliding ball and trunnion joint assembly of the design or construction as illustrated in Warner U. S. Patent No. 1,921,274, the principal difference being that in the joint of this application each of the shafts is additionally provided with a ball 24. Such balls 24 form a part of the coupling between the shafts 16. In joint assemblies of this design each shaft 16 is centered in its body 12 in all positions thereof by centering buttons 26 carried on the ends of the trunnion 28 and by balls 30 which are journaled on the ends of the trunnions 28 with needle roller bearings therebetween. The balls 30 and the centering buttons function in all relative positions of the shaft and the joint body to center the shaft within the body and to transmit torque therebetween, the balls 30 and the centering buttons 26 working in the parallel cylindrical guides 32.

The centering buttons 26 on the ends of each trunnion 28 are swiveled thereon on an axis coincident with that of their trunnion. Each of said centering buttons 26 has a surface engaging the adjacent cylindrical guide 32 beyond the end of the trunnion on which it is swiveled, and each surface of each centering button is curved in the direction of its adjacent cylindrical guide 32 about an axis passing transversely through its associated trunnion and shaft 16 substantially at the center thereof and curved in a direction transversely of its cylindrical guide 32 with a radius of curvature substantially equal to that of such guide. The truncated balls 30 are slidably journaled on the trunnions inwardly of the centering buttons 26, and the balls 30 have a curvature substantially the same as that of the transverse cross section of the guides 32.

A flexible sealing boot 20 is secured to each shaft 16 and to a neck 34 on the body and cooperates therewith to seal the joint while permitting limited angular displacement of the shafts 16 relative to the body 12. Each body is provided with a central bore 36 in line with the opening defined by the neck 34. Except for the opening defined by the neck 34 each body 12 is closed at one end but at the other end the guides 32 and the bore 36 are open, that is, before assembly. At its open end each body is provided with a peripheral, continuous attaching flange 38, the end face of which normal to the axis of the body is finished.

The annular spacer 14 is seated against the finished faces of the flanges 38, and the bodies 12 and the spacer 14 are rigidly and detachably secured together as a unit to form a housing by means of bolts 40, the heads of which bear against the exposed sides of one of the flanges 38 while nuts threadedly secured to the bolts react against the exposed side of the other flange 38. As illustrated in Fig. 1, gaskets may be disposed between the adjacent surfaces of the spacer 14 and the faces of the flanges 38.

The finished faces of the flanges 38 form a transverse guide 39, and a retainer 42 is slidably mounted in such guide. The retainer consists of two annular parts which are interfitted to form a holder for the two bearings 44. Each of the bearings 44 defines a socket 46 in which one of the balls 24 is swiveled. The bearings 44 are each made in two parts so that each of the sockets 46 may be assembled with respect to its respective ball 24. It will be observed that each of the sockets 46 surrounds the ball 24 swiveled therein sufficiently so as to prevent separation of the ball 46 from its socket when the parts are assembled as illustrated in Fig. 1.

The parts just described define the coupling 22 between the shafts 16 and also function as a divider to split the angular displacement in the joint between the shafts 16. The coupling 22 and the sliding arrangement of the retainer 42 thereof in the transverse guide 39 thus function to prevent axial movement of the shafts and the parts carried thereby with respect to the housing 10. Since the coupling 22 includes two ball and socket assemblies, it will be evident that each ball and socket assembly need accommodate only one-half of the total angular displacement between the shafts 16.

During assembly the housing 10 is provided with a suitable quantity of lubricant or grease for lubricating the working parts of the joint. The bearings or centering rings 44 preferably are formed of porous bearing material, such as Oilite. The oscillations of the trunnions in their respective bodies will cause the lubricant therein to be circulated over the working parts of the coupling 22 and the surfaces of the guide for the retainer 42.

While I have illustrated and described a preferred embodiment of my invention, it is understood that this is capable of modification, and I therefore do not wish to be limited to the precise details set forth but desire to avail myself of such changes and alterations as fall within the purview of the following claim.

What is claimed is:

Universal joint construction comprising a pair of hollow bodies disposed in line, each of said bodies having a pair of parallel cylindrical guides closed at one end and open at the other and separated by a center bore which is open at both ends, a neck in line with said bore and projecting from the body at the end having the closed guide ends, and a peripheral continuous attaching flange at the opposite end; a hollow spacer seated on said flanges, means detachably securing said flanges and spacer together to form a rigid enclosing and lubricant containing housing, a shaft freely projecting into the center bore of each body through the neck thereof, sealing means between each shaft and the neck through which it projects so as to seal lubricant within the housing and exclude dirt therefrom, said flanges forming a transverse guide within said housing, a pair of serially disposed swivel couplings interconnecting said shafts, the centers about which said couplings swivel being spaced from each other and disposed on an axis coincident with that of said shafts when the same are in line, said swivel couplings including a part slidable in said transverse guide during angular displacement of said shafts and which cooperates with said transverse guide to prevent axial movement of said shafts relative to said housing and to divide the angular displacement of said shafts equally with respect to said housing in all relative working positions of said shafts and housing, a trunnion carried by each shaft and projecting transversely into the said cylindrical guides of its respective body, each end of each trunnion having a centering button swiveled thereon on an axis coincident with that of its trunnion, each of said centering buttons having a surface engaging the adjacent cylindrical guide beyond the end of the trunnion on which it is swiveled, such surface of each centering button being curved in the direction of its adjacent cylindrical guide about an axis passing transversely through its associated trunnion and shaft substantially at the center thereof, and curved in a direction transversely of its adjacent cylindrical guide with a radius of curvature substantially equal to that of such guide, each end of each trunnion having a truncated ball slidably journaled thereon inwardly of its centering button, one of said truncated balls being disposed in and engaging each cylindrical guide and having a curvature substantially the same as that of the transverse cross section of its associated guide, said swivel couplings, trunnions, truncated balls, centering buttons, and cylindrical guides cooperating to symmetrically position and center said shafts and housing in all relative working positions thereof.

References Cited in the file of this patent

UNITED STATES PATENTS

| | | |
|---|---|---|
| 724,068 | Williams | Mar. 31, 1903 |
| 1,921,274 | Warner | Aug. 8, 1933 |
| 2,087,364 | Trbojevich | July 20, 1937 |
| 2,106,672 | Wollner | Jan. 25, 1938 |
| 2,186,846 | Trbojevich | Jan. 9, 1940 |
| 2,308,073 | Hagerty | Jan. 12, 1943 |